United States Patent [19]

Tamura

[11] Patent Number: 5,710,621
[45] Date of Patent: Jan. 20, 1998

[54] HETERODYNE MEASUREMENT DEVICE AND METHOD

[75] Inventor: Nobuhiko Tamura, Pittsburgh, Pa.

[73] Assignee: Omron Corporation, Japan

[21] Appl. No.: 428,014

[22] Filed: Apr. 25, 1995

[51] Int. Cl.$^6$ .............................. G01C 3/08; G01S 13/08
[52] U.S. Cl. .......................... 356/5.15; 356/5.1; 342/118
[58] Field of Search ................................. 356/5.06, 5.09,
356/5.15; 342/118, 127, 134

[56] References Cited

U.S. PATENT DOCUMENTS

| | | |
|---|---|---|
| 3,713,154 | 1/1973 | Kummer . |
| 3,719,942 | 3/1973 | Herman et al. . |
| 4,743,110 | 5/1988 | Arnaud et al. . |
| 4,834,531 | 5/1989 | Ward . |
| 4,846,571 | 7/1989 | Jelalian et al. . |

*Primary Examiner*—Stephen C. Buczinski
*Attorney, Agent, or Firm*—Dickstein Shapiro Morin & Oshinsky LLP

[57] ABSTRACT

A heterodyne measurement system and method for determining a distance between a reference point and an object using a continuous measurement beam, a continuous reference beam, an intensity modulated measurement beam, and an intensity modulated reference beam. The continuous measurement beam and the intensity modulated measurement beam are directed from the reference point toward the object to produce a reflected continuous measurement beam and a reflected intensity modulated measurement beam, respectively. The reflected continuous measurement beam and the continuous reference beam are combined to produce a first beat signal and the reflected intensity modulated measurement beam and the intensity modulated reference beam are combined to produce a second beat signal. The first beat signal is integrated to produce a first integration value and the second beat signal is integrated to produce a second integration value. The distance between the reference point and the object is determined in accordance with the first and second integration values.

17 Claims, 5 Drawing Sheets

HETERODYNE MEASUREMENT DEVICE AND METHOD

BACKGROUND OF THE INVENTION

1. Field of the Invention

The present invention relates to a measurement device and method. More particularly, the present invention relates to a heterodyne measurement device and method.

2. Description of the Related Art

Optical measurement devices which use heterodyne schemes for measuring distances are known. Generally, these devices transmit a frequency-modulated wave (modulation signal and carrier signal) towards an object, detect the combination of the reflected wave and a reference wave to produce a beat signal. The distance to the object is obtained by correlating this beast signal with the modulation signal used for modulating the frequency modulated wave signal. Typically, these devices require the use of a laser whose coherence distance is at least twice the distance being measured. While such lasers are available, they are generally quite expensive and bulky, which prohibits their use in lower-priced and compact measurement devices.

Optical measurement devices which use pulse-echo measurement schemes for measuring distances are also known. These devices, however, typically require the use of a photodetector with a wide response bandwidth, which results a high level of noise. Since distances cannot be measured if signal levels fall below the noise level, only short distances can be measured.

SUMMARY OF THE INVENTION

The present invention is directed to a heterodyne measurement device that substantially obviates one or more of the problems due to the limitations and disadvantages of the related art.

Accordingly, an object of the present invention is to provide a heterodyne measurement device and method which utilize an inexpensive laser with a short coherence distance and which enable measurement of long distances.

Another object of the present invention is to provide a heterodyne measurement device and method which do not involve frequency modulation.

Yet another object of the present invention is to provide a heterodyne measurement device and method which have a better signal-to-noise (S/N) ratio and which can measure longer distances than measurement devices which use a pulse-echo scheme.

Additional features and advantages of the invention will be set forth in the description which follows, and in part will be apparent from the description, or may be learned by practice of the invention. The objectives and other advantages of the invention will be realized and attained by the apparatus particularly pointed out in the written description and claims hereof as well as the appended drawings.

To achieve these and other advantages and in accordance with the purpose of the invention, as embodied and broadly described, a heterodyne measurement system is provided, comprising: an electromagnetic radiation source, the electromagnetic radiation source providing a continuous measurement beam, a continuous reference beam, an intensity modulated ("IM") measurement beam, and an intensity modulated reference beam; directing means for directing the continuous measurement beam and the intensity modulated measurement beam toward an object to produce a reflected continuous measurement beam and a reflected intensity modulated measurement beam; combining means for combining the reflected continuous measurement beam and the continuous reference beam to produce a first beat signal and for combining the reflected Intensity modulated measurement beam and the intensity modulated reference beam to produce a second beat signal; integrating means for integrating the first beat signal to produce a first integration value and for integrating the second beat signal to produce a second integration value; and distance determining means for determining a distance between the heterodyne measurement device and the object in accordance with the first and second integration values.

To further achieve these and other advantages and in accordance with the purpose of the invention, as embodied and broadly described, a method of measuring a distance between a reference point and an object is provided, comprising the steps of: providing a continuous measurement beam, a continuous reference beam, an intensity modulated measurement beam, and an intensity modulated reference beam; directing the continuous measurement beam and the intensity modulated measurement beam from the reference point toward the object to produce a reflected continuous measurement beam and a reflected intensity modulated measurement beam; combining the reflected continuous measurement beam and the continuous reference beam to produce a first beat signal and combining the reflected intensity modulated measurement beam and the intensity modulated reference beam to produce a second beat signal; integrating the first beat signal to produce a first integration value and integrating the second beat signal to produce a second integration value; and determining the distance between the reference point and the object in accordance with the first and second integration values.

To still further achieve these and other advantages and in accordance with the purpose of the invention, as embodied and broadly described, a method of measuring a distance between a reference point and an object is provided, comprising: a first step of providing a continuous measurement beam and a continuous reference beam; a second step of directing the continuous measurement beam from the reference point toward the object to produce a reflected continuous measurement beam; a third step of combining the reflected continuous measurement beam and the continuous reference beam to produce a first beat signal; a fourth step of integrating the first beat signal to produce a first integration value; a fifth step of providing an intensity modulated measurement beam and an intensity modulated reference beam; a sixth step of directing the intensity modulated measurement beam from the reference point toward the object to produce a reflected intensity modulated measurement beam; a seventh step of combining the reflected intensity modulated measurement beam and the intensity modulated reference beam to produce a second beat signal; an eighth step of integrating the second beat signal to produce a second integration value; and a ninth step of determining the distance between the reference point and the object in accordance with the first and second integration values.

BRIEF DESCRIPTION OF THE DRAWINGS

The accompanying drawings, which are included to provide a further understanding of the invention and are incorporated in and constitute a part of this specification, illustrate one embodiment of the invention and together with the description serve to explain the principles of the invention. In the drawings.

DETAILED DESCRIPTION OF THE INVENTION

Figure 1:
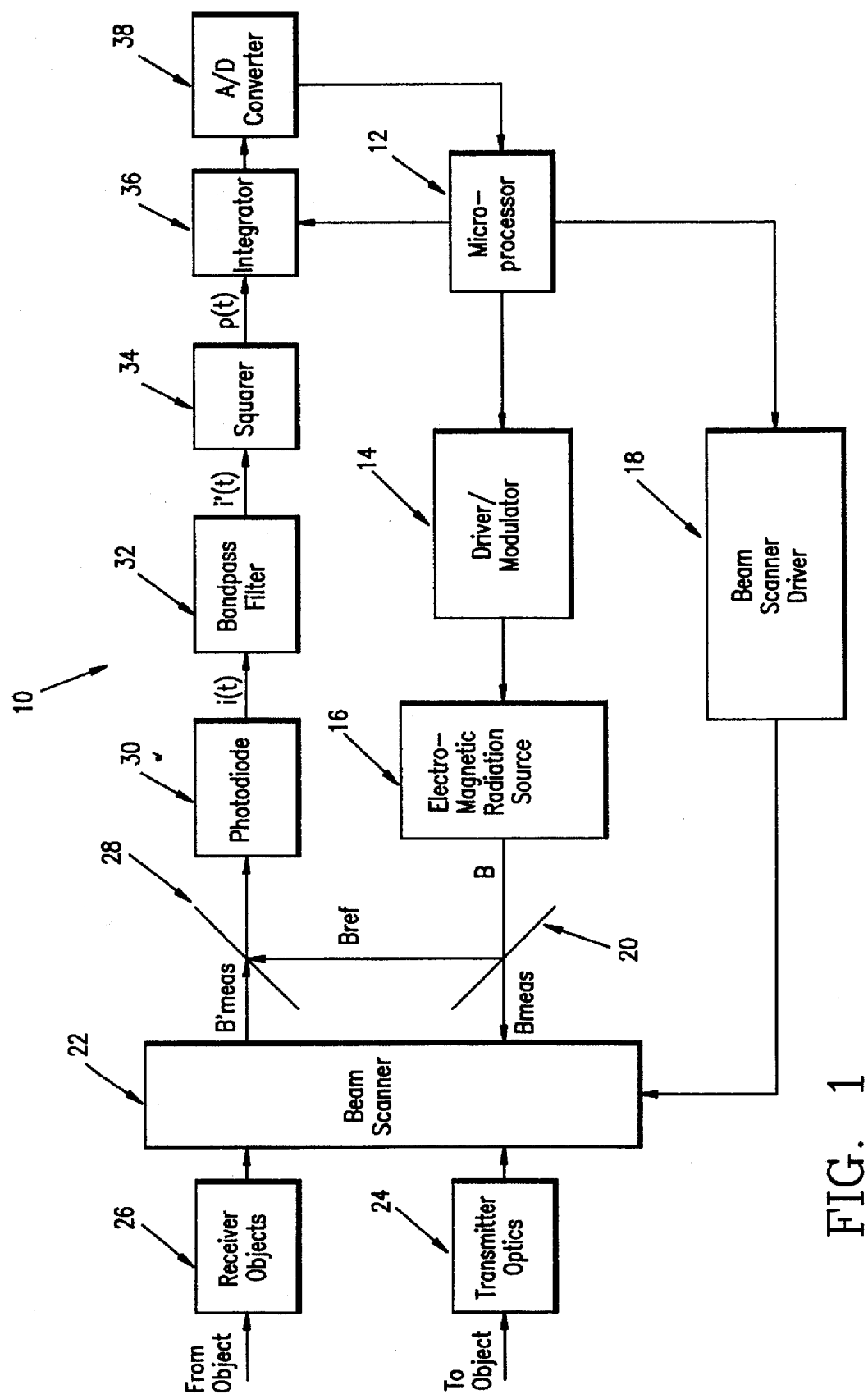
FIG. 1 is a block diagram of a heterodyne measurement device according to the present invention.

Reference will now be made in detail to the present preferred embodiment of the invention, an example of which is illustrated in the accompanying drawings. An exemplary embodiment of the heterodyne measurement device of the present invention is shown in FIG. 1 and is designated generally by reference numeral 10.

As embodied herein and referring to FIG. 1, the heterodyne measurement device 10 comprises a microprocessor 12, a driver/modulator 14, an electromagnetic radiation source 16 such as a laser diode with a collimator lens, a beam scanner driver 18, a first beam splitter 20, a beam scanner 22, and transmitter optics 24. The heterodyne measurement device 10 further comprises receiver optics 26, a second beam splitter 28, a photodiode with collimator lens 30, a bandpass filter 32, a squarer 34, an integrator 36, and an analog-to-digital (A/D) converter 38.

During operation of the heterodyne measurement device 10, the microprocessor 12 controls the driver/modulator 14, which in turn drives the laser diode 16 such that the laser diode 16 emits an optical beam B. Devices which can be utilized as the microprocessor 12 and the driver/modulator 14 are well known in the art and, therefore, descriptions of such devices are omitted.

The beam B emitted by the laser diode 16 is split by the first beam splitter 20 into a measurement beam $B_{meas}$ and a reference beam $B_{ref}$. The first beam splitter 20 can comprise, for example, a half mirror or other device known in the art for separating the beam B into the measurement beam $B_{meas}$ and the reference beam $B_{ref}$. The first beam splitter 20 is configured such that the measurement beam $B_{meas}$ is directed toward the beam scanner 22 and the reference beam $B_{ref}$ is directed toward the second beam splitter 28. Preferably, the first beam splitter 20 splits the beam B in a such a manner that the measurement beam $B_{meas}$ has approximately 85–95% of the energy of the beam B and the reference beam $B_{ref}$ has approximately 5–15% of the energy of the beam B. It should be understood, however, that the energies of the measurement beam $B_{meas}$ and reference beam $B_{ref}$ can be varied in accordance with the saturation level of the photodiode 30 as is known in the art.

Although the embodiment of FIG. 1 includes the first beam splitter 20 to split the beam B into the measurement beam $B_{meas}$ and the reference beam $B_{ref}$, it is contemplated that the laser diode 16 and the first beam splitter 20 can be replaced with two separate laser diodes, one of which produces the measurement beam $B_{meas}$ and the other of which produces the reference beam $B_{ref}$. It is further contemplated that the laser diode 16 can be replaced with a gas laser or other device known in the art for producing the optical beam B.

The measurement beam $B_{meas}$ is reflected by the beam scanner 22 and transmitted by the transmitter optics 24 towards an object whose distance from the heterodyne measurement device 10 is to be determined. The beam scanner 22 can comprise, for example, a rotating polygonal mirror, galvanometer, acoustooptic scanner, Bragg scanner, or other device known in the art for directing the measurement beam $B_{meas}$ toward the transmitter optics 24. The beam scanner 22 is controlled by the beam scanner driver 18, which is in turn controlled by the microprocessor 12. Devices which can be utilized as the beam scanner driver 18 are well known in the art and, therefore, descriptions of such devices are omitted.

The transmitter optics 24 can comprise, for example, a collimator or other device known in the art for focusing the measurement beam $B_{meas}$ at the object. Although FIG. 1 shows the transmitter optics 24 following the beam scanner 22 along the path of the measurement beam $B_{meas}$, it should be understood that the positions of the transmitter optics 24 and beam scanner 22 can be reversed.

Upon striking the object, the measurement beam $B_{meas}$ is reflected therefrom as a reflected measurement beam $B'_{meas}$, which is received by the receiver optics 26 and directed by the receiver optics 26 toward the beam scanner 22. The beam scanner 22 reflects the reflected measurement beam $B'_{meas}$ toward the second beam splitter 28. The receiver optics 26, like the transmitter optics 24, can comprise, for example, a collimator or other device known in the art for focusing the reflected measurement beam $B'_{meas}$ at the beam scanner 22. The position of the receiver optics 26 with respect to the position of the beam scanner 22 can be reversed from that shown in FIG. 1 as was the case with the transmitter optics 24.

Both the reflected measurement beam $B'_{meas}$ and the reference beam $B_{ref}$ are directed toward the photodiode 30 by the second beam splitter 28. The second beam splitter 28, like the first beam splitter 20, can comprise, for example, a half mirror or other device known in the art for directing the reflected measurement beam $B'_{meas}$ and the reference beam $B_{ref}$ toward the photodiode 30.

Upon striking the photodiode 30, the reflected measurement beam $B'_{meas}$ and the reference beam $B_{ref}$ are combined to produce a beat signal i(t). The beat signal i(t) from the photodiode 30 is then passed through the bandpass filter 32 to produce a signal i'(t).

Figure 2:
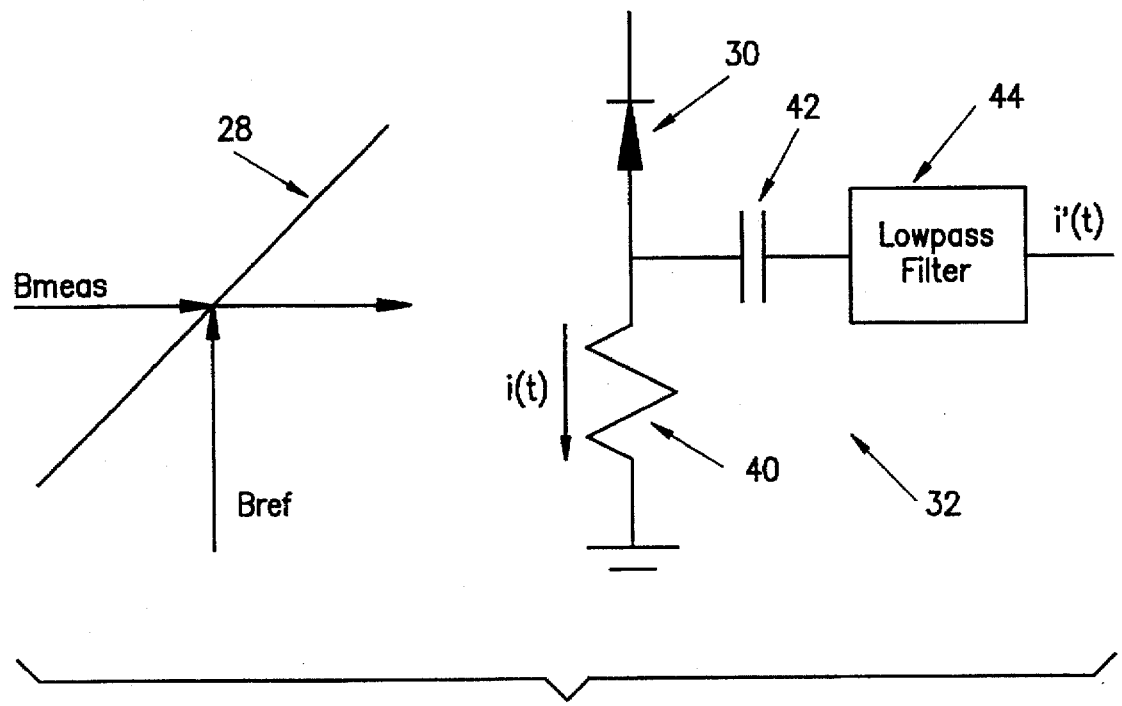
FIG. 2 is a block diagram of a bandpass filter according to the present invention.

As shown in FIG. 2, the bandpass filter 32 can comprise, for example, a DC cut filter, including a load resistor 40 and a coupling capacitor 42, in conjunction with a lowpass filter 44 of a known design. As the reflected measurement beam $B'_{meas}$ and the reference beam $B_{ref}$ strike the photodiode 30, they are combined to produce a current i(t) through the load resistor 40 in accordance with equation (1) below:

$$i(t) = \eta |a_L \exp(j2\pi v t) + a_R \exp(j2\pi(v+\Delta v)t)|^2 \qquad (1)$$

where:

$B'_{meas} = a_r \exp(j2\pi(v+\Delta v)t)$; and $B_{ref} = a_L \exp(j2\pi v t)$.

The current i(t) is then coupled through the coupling capacitor 42 and filtered by the lowpass filter 44 to produce a current i'(t) in accordance with equation (2) below:

$$i'(t) = 2\eta \sqrt{PL} \sqrt{PR} \cos(2\pi \Delta v t) \qquad (2)$$

where:

η=the quantum efficiency of the photodiode 30;

PL=the intensity of the reference beam $B_{ref}$ (=$a_L^2$);

PR=the intensity of the reflected measurement beam $B'_{meas}$ ($=a_R^2$); and $\Delta v = v$ which is the sum of two frequency shifts. The first shift is due to the instability of the laser itself. Because the frequency of the laser varies in time and the received beam was generated earlier while the reference beam was generated later, this difference between the two frequencies is the cause of the frequency shift. The second shift is due to the Doppler sift. The amount of shift is proportional to the relative velocity between the object and the measurement system.

It should be understood that various bandpass filter circuits other than that shown in FIG. 2 can be used as the bandpass filter 32, as is known in the art. However, regardless of the specific circuit used for the bandpass filter 32, the bandpass filter 32 preferably has the frequency response characteristics shown in FIG. 3.

Figure 3:
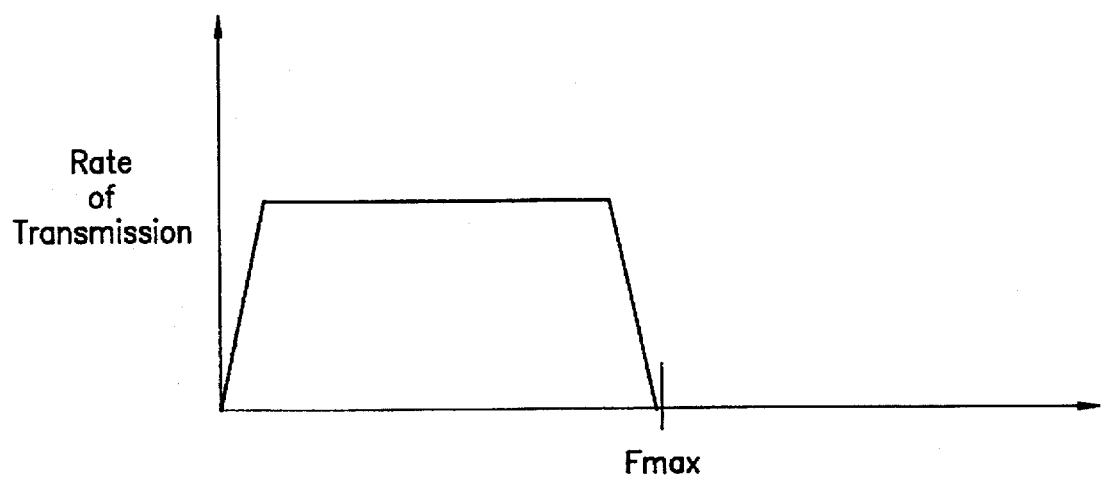
FIG. 3 is a frequency characteristic diagram of the bandpass filter of FIG. 2.

As shown in FIG. 3, the DC component is rejected and the transmission band of the bandpass filter 32 preferably extends to $F_{max}$, where $F_{max}$ is calculated in accordance with equation (3) below:

$$F_{max} = C/\Delta L + 2v_{max}/\lambda \qquad (3)$$

where:

C=the speed of light ($=3 \times 10^8$ m/s);

$\Delta L$=the coherence distance of the laser diode 16;

$v_{max}$=the expected maximum relative velocity of the object; and $\lambda$=the wavelength of the laser.

Thus, if the coherence distance of the laser diode 16 is 10 meters and the relative velocity of the object is small and negligible, then the bandpass filter 32 preferably has a transmission band of 0–30 MHz. It should be appreciated that if the object has relative velocity of 200 km/hr or 55 m/s and the wavelength of the laser is 1300 nm then it requires additional 85 MHz or 115 MHz bandwidth total. The bandpass filter 32 has the effect of filtering out both the DC component of the beat signal i(t) and any high frequency noise.

Once the beat signal i(t) produced by the photodiode 30 is filtered by the bandpass filter 32 to produce the signal i'(t), the signal i'(t) is squared by the squarer 34 to provide a signal p(t) in accordance with equation (4) below:

$$p(t) = [i'(t)]^2 = [2\eta \sqrt{PL} \sqrt{PR} \cos(2\pi \Delta v t)]^2 \qquad (4)$$

The signal p(t) produced by the squarer 34 is then integrated over a predetermined time period by the integrator 36 to produce a DC value. This DC value is converted to digital form by the A/D converter 38 and supplied to the microprocessor 12.

Figure 4:
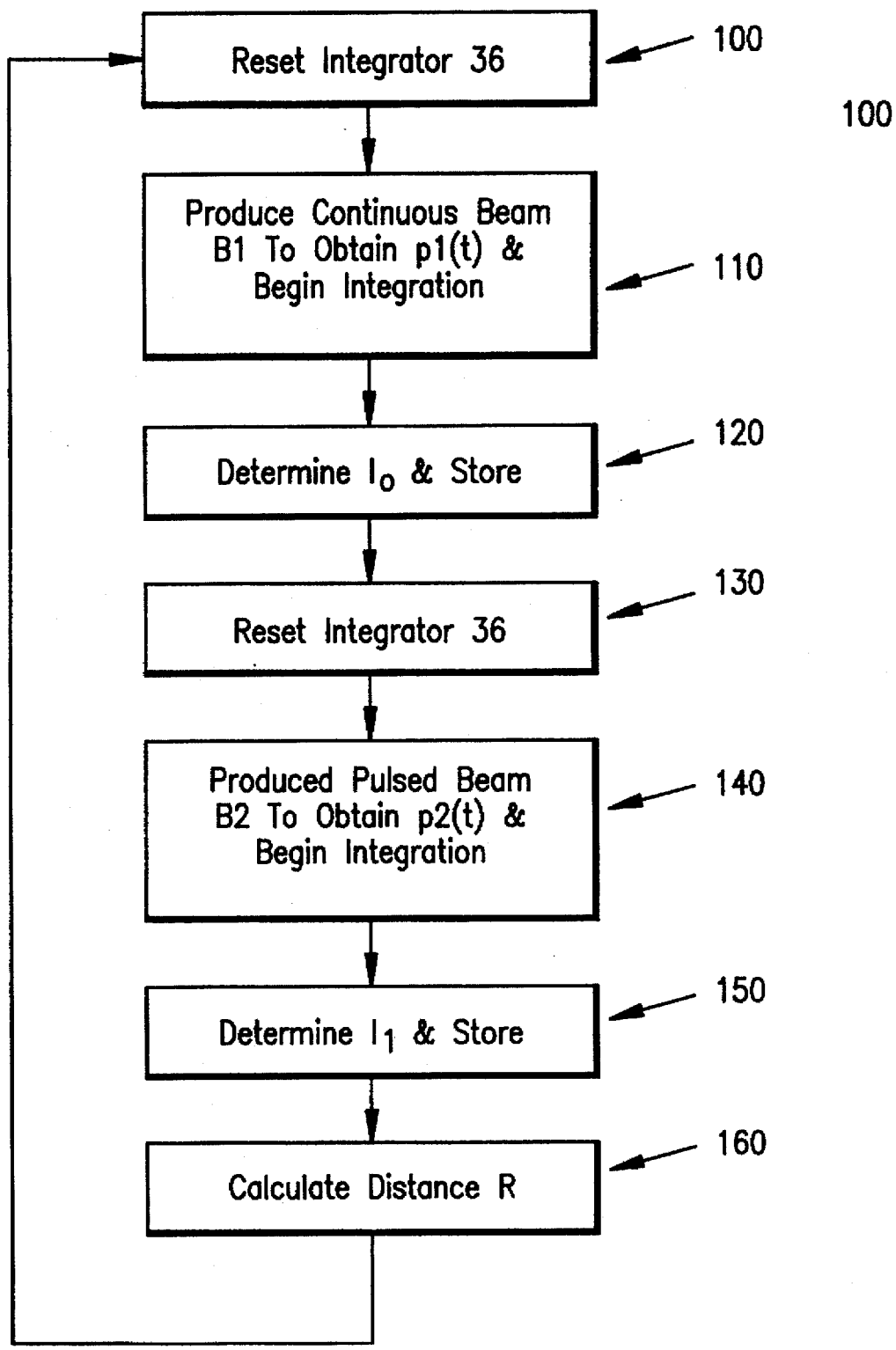
FIG. 4 is a flow chart of an operation performed by the heterodyne measurement device according to the present invention.

Detection of the distance from the heterodyne measurement device 10 to an object will now be described with reference to the flow chart 100 shown in FIG. 4 and the timing diagrams shown in FIGS. 5(a) through 5(h).

In step 100, the microprocessor resets the integrator 36.

In step 110, the microprocessor 12 controls the driver/modulator 14 to continuously drive the laser diode 16 such that the laser diode 16 outputs a continuous beam B for a time period t=0 to t=T. At the same time, the microprocessor 12 turns on the integrator 36.

Preferably, the time T is selected to optimize certain characteristics of the heterodyne measurement system 10. For example, the time T can be made small to thereby enable faster measurements should the relative speed between the heterodyne measurement system 10 and the object be large. Likewise, the time T can be made large to thereby increase the S/N ratio of the heterodyne measurement system 10.

The continuous beam $B_1$ produced by the laser diode 16 is split by the beam splitter 20 into a measurement beam $B_{meas}$ and a reference beam $B_{ref}$. The measurement beam $B_{meas1}$ is directed toward the object by the beam scanner 22 and the transmitter optics 24 and reflected by the object as a reflected measurement beam $B'_{meas1}$.

Figure 5A:
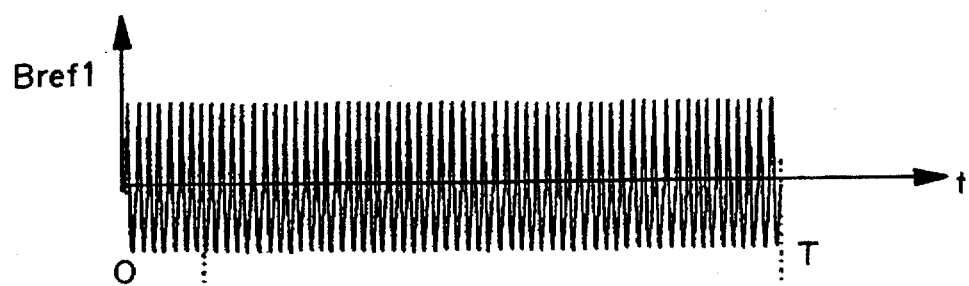
FIGS. 5(a) through 5(h) are timing diagrams for the heterodyne measurement device according to the present invention.
Figure 5B:
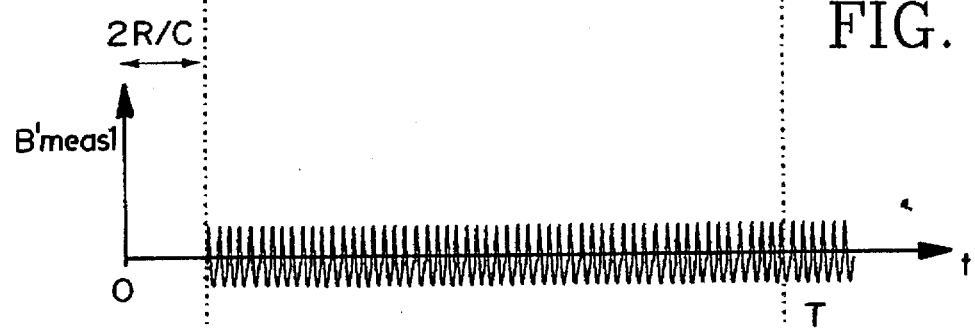

The reflected measurement beam $B'_{meas1}$ is received by the receiver optics 26 and directed by the beam scanner 22 toward the beam splitter 28 such that the reflected measurement beam $B'_{meas1}$ and the reference beam $B_{ref1}$ are directed toward the photodiode 30. As shown in FIGS. 5(a) and 5(b), the reflected measurement beam $B'_{meas1}$ is delayed with respect to the reference beam $B_{ref1}$ by a delay time $\tau = 2R/C$, where R is the distance to the object and C is the speed of light.

Figure 5C:
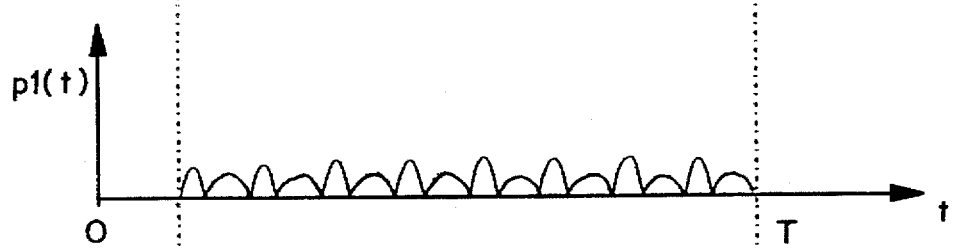

Upon impinging on the photodiode 30, the reflected measurement beam $B'_{meas1}$ and the reference beam $B_{ref1}$ are combined to produce a beat signal during the period from $t=\tau$ to $t=T$. This beat signal is filtered by the bandpass filter 32 and squared by the squarer 34 as explained above to produce the signal $p_1(t)$ as shown in FIG. 5(c).

Figure 5D:
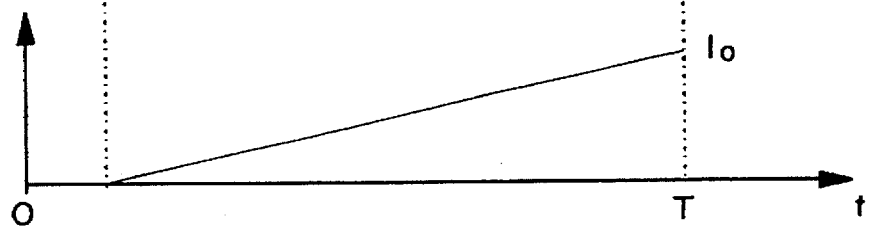

In step 120, the integrator 36 integrates the output of the squarer 34 for the time period t=0 to t=T to produce a DC value $I_0$ as shown in FIG. 5(d). The DC value $I_0$ is subsequently converted to digital form by the A/D converter 38 and supplied to the microprocessor 12 where it is stored.

In step 130, the microprocessor 12 resets the integrator 36.

In step 140, the microprocessor 12 controls the driver/modulator 14 to selectively drive the laser diode 16, i.e., repeatedly turn the laser diode 16 on and off, such that the laser diode 16 produces an intensity modulated beam $B_2$ for the same time period t=0 to t=T used in step 110. At the same time, the microprocessor 12 turns on the integrator 36. Preferably, the driver/modulator 14 repeatedly turns the laser diode 16 on and off for equal amounts of time such that the pulsed beam $B_2$ has a duty factor of 50%. Further, the pulsed beam $B_2$ preferably has an amplitude equal to that of the continuous beam $B_1$ produced in step 110.

The pulsed beam $B_2$ produced by the laser diode 16 is split by the beam splitter 20 into a measurement beam $B_{meas2}$ and a reference beam $B_{ref}$. The measurement beam $B_{meas2}$ is directed toward the object by the beam scanner 22 and the transmitter optics 24 and reflected by the object as a reflected measurement beam $B'_{meas2}$.

Figure 5E:
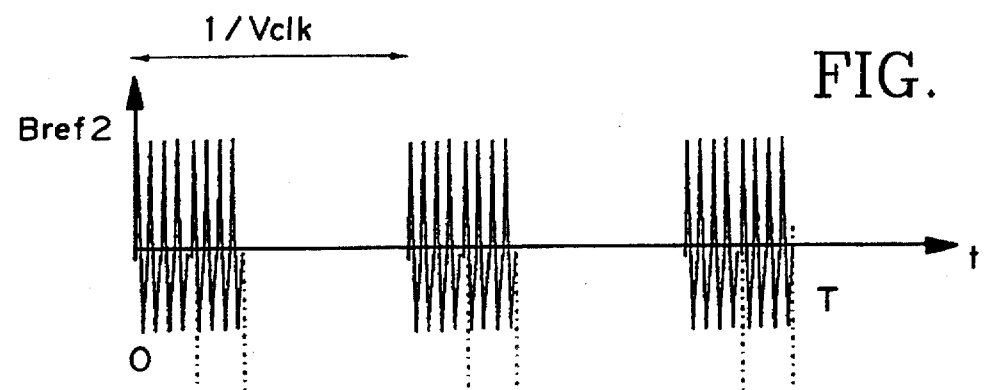
Figure 5F:
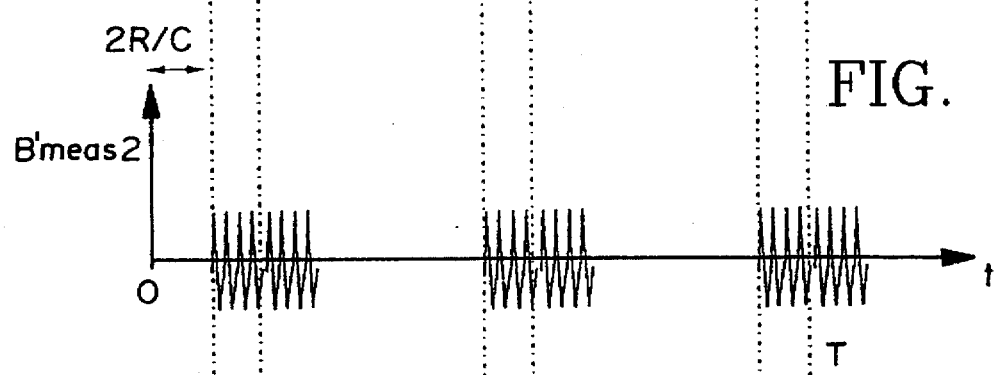

The reflected measurement beam $B'_{ref2}$ is received by the receiver optics 26 and directed by the beam scanner 22 toward the beam splitter 28 such that the reflected measurement beam $B'_{meas2}$ and the reference beam $B_{ref2}$ are directed toward the photodiode 30. As shown in FIGS. 5(e) and 5(f), the reflected measurement beam $B'_{meas2}$ is delayed with respect to the reference beam $B_{ref2}$ by a delay time $\tau = 2R/C$, where R is the distance to the object and C is the speed of light.

Figure 5G:
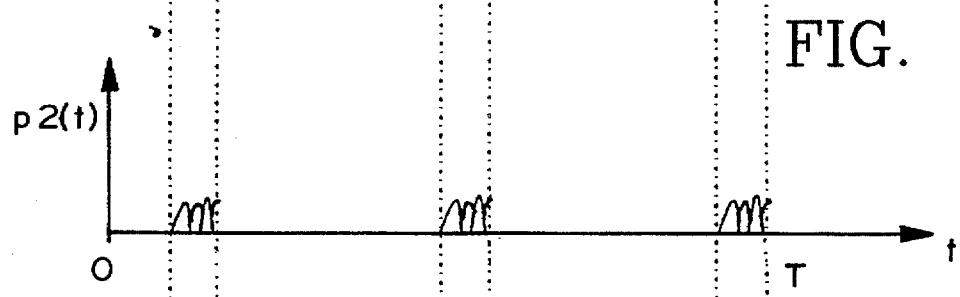

Upon impinging the photodiode 30, the reflected measurement beam $B'_{meas2}$ and the reference beam $B_{ref2}$ are combined to produce a beat signal during the period from $t=\tau$ to $t=T$. This beat signal is filtered by the bandpass filter 32 and squared by the squarer 34 as explained above to produce the signal $p_2(t)$ as shown in FIG. 5(g).

Figure 5H:
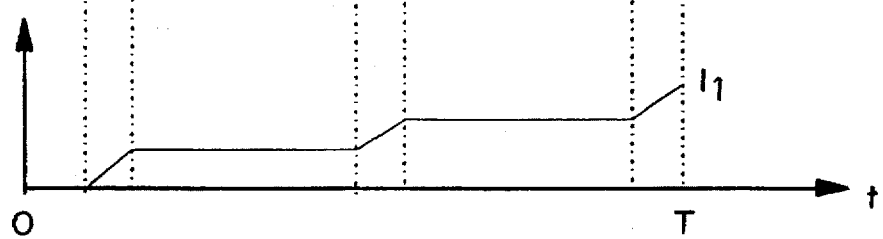

In step 150, the integrator 36 integrates the output of the squarer 34 for the time period t=0 to t=T to produce a DC value $I_1$ as shown in FIG. 5(h). The DC value $I_1$ is subsequently converted to digital form by the A/D converter 38 and supplied to the microprocessor 12 where it is stored.

In step 160, the microprocessor 12 calculates the distance R to the object from $I_0$ and $I_1$ in accordance with equations (5) and (6) below:

$$\frac{I_1}{I_0} = \frac{(1/2v_{clk}) - \tau}{(1/v_{clk})} = \frac{1}{2} - \frac{2Rv_{clk}}{C} \quad (5)$$

$$R = \frac{C}{2v_{clk}} (1/2 - I_1/I_0) \quad (6)$$

where:

R=the distance to the target;

C=the speed of light;

$v_{clk}$=the frequency of the pulsed beam $B_2$; and

τ=the time it takes the measurement beam $B_{meas1/2}$ to travel twice R.

The process begins again from step 100 in which the microprocessor 12 resets the integrator 36.

It will be apparent to those skilled in the art that various modifications and variations can be made in the heterodyne measurement device without departing from the spirit or scope of the invention. For example, while the present invention has been described in connection with using optical beams to make measurements, it is contemplated that other types of electromagnetic radiation, e.g., microwaves, x-rays, gamma rays, etc., can also be used to make measurements using the present invention. Further, the order in which the steps of the flow diagram 100 of FIG. 4 is performed can be modified. For example, it is possible to switch the order of steps 110 and 140 and to switch the order of steps 120 and 150. Thus, it is intended that the present invention cover the modifications and variations of this invention provided they come within the scope of the appended claims and their equivalents.

What is claimed is:

1. A heterodyne measurement system, comprising:

an electromagnetic radiation source, the electromagnetic radiation source providing a continuous measurement beam for a predetermined time period, a continuous reference beam for the predetermined time period, an intensity modulated measurement beam, and an intensity modulated reference beam;

directing means for directing the continuous measurement beam and the intensity modulated measurement beam toward an object to produce a reflected continuous measurement beam and a reflected intensity modulated measurement beam;

combining means for combining the reflected continuous measurement beam and the continuous reference beam to produce a first beat signal and combining the reflected intensity modulated measurement beam and the intensity modulated reference beam to produce a second beat signal;

integrating means for integrating the first beat signal over the predetermined time period to produce a first integration value and for integrating the second beat signal to produce a second integration value; and distance determining means for determining a distance between the heterodyne measurement device and the object in accordance with the first and second integration values.

2. The heterodyne measurement system of claim 1, wherein the electromagnetic radiation source includes a laser diode and a beam splitter.

3. The heterodyne measurement system of claim 1, wherein the electromagnetic radiation source includes first and second laser diodes.

4. The heterodyne measurement system of claim 1, wherein the directing means includes at least one of a beam scanner and a collimator.

5. The heterodyne measurement system of claim 1, wherein the combining means includes a photodiode.

6. The heterodyne measurement system of claim 5, wherein the combining means further includes at least one of a beam scanner and a collimator.

7. The heterodyne measurement system of claim 1, wherein the electromagnetic radiation source provides the continuous measurement and reference beams and the intensity modulated measurement and reference beams for a time period t=0 to t=T, and wherein the integrating means integrates the first and second beat signals for the time period t=0 to t=T.

8. The heterodyne measurement system of claim 1, wherein each of the intensity modulated measurement and intensity modulated reference beams has a duty factor of 50%.

9. The heterodyne measurement system of claim 1, wherein each of the intensity modulated measurement and intensity modulated reference beams has a duty factor between 0% and 100%.

10. The heterodyne measurement system of claim 1, wherein the distance determining means determines the distance between the heterodyne measurement device and the object as follows:

$$R = \frac{C}{2v_{clk}} (1/2 - I_1/I_0)$$

wherein R represents the distance between the heterodyne measurement device and the object, C is the speed of light, $v_{clk}$ is the frequency of the intensity modulated measurement beam, $I_0$ represents the first integration value, and $I_1$ represents the second integration value.

11. A method of measuring a distance between a reference point and an object, comprising the steps of:

providing a continuous measurement beam for a predetermined time period, a continuous reference beam for the predetermined time period, an intensity modulated measurement beam, and an intensity modulated reference beam;

directing the continuous measurement beam and the intensity modulated measurement beam from the reference point toward the object to produce a reflected continuous measurement beam and a reflected intensity measurement beam; and combining the reflected continuous measurement beam and the continuous reference beam to produce a first beat signal and for combining the reflected intensity modulated measurement beam and the intensity modulated reference beam to produce a second beat signal;

integrating the first beat signal over the predetermined time period to produce a first integration value and integrating the second beat signal to produce a second integration value; and determining the distance between the reference point and the object in accordance with the first and second integration values.

12. The method of claim 11, wherein the step of providing the continuous measurement beam, the continuous reference beam, the intensity modulated measurement beam, and the intensity modulated reference beam includes the step of providing the continuous measurement and reference beams and the intensity modulated measurement and reference beams for a time period t=0 to t=T; and wherein the step of integrating the first and second beat signals includes the step of integrating the first and second beat signals for the time period t=0 to t=T.

13. The method of claim 12, wherein each of the intensity modulated measurement and intensity modulated reference beams has a duty factor of 50%.

14. The method of claim 11, wherein each of the intensity modulated measurement and intensity modulated reference beams has a duty factor between 0% and 100%.

15. The method of claim 11, wherein the step of determining the distance between the object and the reference point includes the step of determining the distance between the reference point and the object as follows:

$$R = \frac{C}{2v_{clk}} (1/2 - I_1/I_0)$$

wherein R represents the distance between the heterodyne measurement device and the object, C is the speed of light, $v_{clk}$ is the frequency of the intensity modulated measurement beam, $I_0$ represents the first integration value, and $I_1$ represents the second integration value.

16. A method of measuring a distance between a reference point and an object, comprising:

a first step of providing a continuous measurement beam for a predetermined time period and a continuous reference beam for the predetermined time period;

a second step of directing the continuous measurement beam from the reference point toward the object to produce a reflected continuous measurement beam;

a third step of combining the reflected continuous measurement beam and the continuous reference beam to produce a first beat signal;

a fourth step of integrating the first beat signal over the predetermined time period to produce a first integration value;

a fifth step of providing an intensity modulated measurement beam and an intensity modulated reference beam;

a sixth step of directing the intensity modulated measurement beam from the reference point toward the object to produce a reflected intensity modulated measurement beam;

a seventh step of combining the reflected intensity modulated measurement beam and the intensity modulated reference beam to produce a second beat signal;

an eighth step of integrating the second beat signal to produce a second integration value; and a ninth step of determining the distance between the reference point and the object in accordance with the first and second integration values.

17. The method of claim 16, wherein the fifth through eighth steps are performed prior to performing the first through fourth steps.

* * * * *

UNITED STATES PATENT AND TRADEMARK OFFICE
CERTIFICATE OF CORRECTION

PATENT NO. : 5,710,621
DATED : January 20, 1998
INVENTOR(S) : Nobuhiko Tamura

It is certified that error appears in the above-indentified patent and that said Letters Patent is hereby corrected as shown below:

On the title page, the assignee should read:
--Omron Corporation, Japan and Optomation, Inc., Pennsylvania--

Signed and Sealed this

Fourth Day of August, 1998

Attest:

BRUCE LEHMAN

Attesting Officer            Commissioner of Patents and Trademarks